United States Patent
Nguyen

(10) Patent No.: US 7,685,539 B2
(45) Date of Patent: Mar. 23, 2010

(54) USER INTERFACE FOR STYLUS-BASED USER INPUT

(75) Inventor: Vu Nguyen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 709 days.

(21) Appl. No.: 11/025,261

(22) Filed: Dec. 29, 2004

(65) Prior Publication Data

US 2005/0114797 A1 May 26, 2005

Related U.S. Application Data

(63) Continuation of application No. 09/998,020, filed on Nov. 30, 2001, now Pat. No. 6,938,221.

(51) Int. Cl.
*G06F 3/033* (2006.01)
(52) U.S. Cl. ............... 715/863; 715/864; 715/810; 345/173
(58) Field of Classification Search ......... 715/863, 715/864, 810, 802, 808, 708, 716, 173
See application file for complete search history.

(56) References Cited

U.S. PATENT DOCUMENTS

| | | | |
|---|---|---|---|
| 5,347,295 A | 9/1994 | Agulnick et al. ............ 345/156 |
| 5,760,773 A | 6/1998 | Berman et al. ............ 345/808 |
| 5,778,404 A | 7/1998 | Capps et al. ............ 715/531 |
| 6,018,336 A * | 1/2000 | Akiyama et al. ............ 345/173 |
| 6,262,719 B1 * | 7/2001 | Bi et al. ............ 345/179 |
| 6,664,991 B1 | 12/2003 | Chew et al. ............ 345/863 |
| 7,293,231 B1 * | 11/2007 | Gunn et al. ............ 345/179 |
| 7,319,454 B2 * | 1/2008 | Thacker et al. ............ 345/163 |
| 2002/0008693 A1 | 1/2002 | Banerjee et al. ............ 345/182 |
| 2002/0056575 A1 | 5/2002 | Keely et al. ............ 178/18.01 |
| 2002/0057263 A1 | 5/2002 | Keely et al. ............ 345/179 |
| 2002/0089547 A1 | 7/2002 | Huapaya ............ 345/802 |
| 2003/0007018 A1 | 1/2003 | Seni et al. ............ 345/864 |
| 2003/0071850 A1 | 4/2003 | Geidl ............ 345/781 |

* cited by examiner

*Primary Examiner*—Tadeese Hailu
(74) *Attorney, Agent, or Firm*—Lee & Hayes, PLLC

(57) ABSTRACT

Systems and methods for a user interface for stylus-based user input is described. In one aspect, a stylus-based user input is received. Responsive to receiving the input, a menu is displayed. The menu includes selectable items to allow a user, by selecting one of the selectable items, to direct the computer system to generate right-mouse button input or to interpret one or more subsequent stylus-based user inputs as hover cursor input, keyboard-like input, or handwriting input.

18 Claims, 9 Drawing Sheets

USER INTERFACE FOR STYLUS-BASED USER INPUT

RELATED APPLICATIONS

This application is a continuation under 37 CFR 1.53(b) of co-pending and commonly owned patent application Ser. No. 09/998,020 filed on Nov. 30, 2001, titled "User Interface for Stylus-Based User Input", hereby incorporated by reference.

TECHNICAL FIELD

The following description relates to user interface.

BACKGROUND

User interface (UI) is often one of the most important parts of a computer program because it determines how easily a user can communicate with the program. A powerful program with a poorly designed UI has little value. Text-based and graphical user interfaces (GUIs) that use windows, icons, and pop-up menus have become standard on personal computers. Text-based UIs as well as GUIs typically use an input device, such as a keyboard, mouse or stylus, to provide user input and control the movement of a cursor or pointer on a display screen.

A mouse is a small object you can roll along a surface. As you move the mouse, a pointer on the display screen typically moves in the same direction over various controls in a UI. Mice contain at least one button and sometimes as many as three, which have different functions depending on what program is running. For instance, consider that the mouse has left and right buttons, wherein a left button selection (or "click") is interpreted by the program as the selection of an underlying component of the UI. Whereas, a right mouse button click over that same underlying UI component may bring up a context-sensitive help menu corresponding to the underlying UI component; selection of any action items on the help menu can then be made by left-clicking the selected item. The help menu is context-sensitive, meaning that the content of the menu corresponds to the object that is underneath the mouse cursor.

For example, a right-click on a selected block of text in a Microsoft Word document brings up a help menu offering action items such as "Cut", "Copy", "Paste", "Font" and "Paragraph". A right-click a blank spot on the same Microsoft Word document brings up a menu where "Cut", "Copy" and "Paste" are disabled. In the context of a web browser, however, a right-click on a blank spot of an HTML webpage brings up a menu offering action items such as "Back", "Forward", "Print" and "Refresh".

In the event that a mouse is not desired or unavailable, a program UI is often designed to work with a keyboard. For instance, a user may be able to press a specific key (e.g., the "tab" key) to move a selection point on the UI to highlight various controls (e.g., buttons, text input controls, and so on). Context sensitive help for the highlighted control may be available via an additional press of another key on the keyboard. Additionally, a highlighted control can typically be selected with a subsequent press of another key (e.g., the "enter" key).

A general purpose home-based personal computer (PC) typically includes at least a keyboard and a mouse for a user to provide data input and control the movement of a cursor or pointer on a display screen. However, the need for more portable computing is driving the computing industry to develop ever more compact and portable computing devices such as laptops, personal digital assistants (PDA), digital tablets, and so on. These devices may or may not include a keyboard or mouse interface.

For example, a PDA or a digital tablet may require the user to provide input and control though a combination of a touch sensitive screen and a pen-like pointing device or stylus, rather than through a conventional keyboard and mouse device. There are a number of problems that arise with respect to attempting to provide an effective UI when moving from a keyboard and/or mouse interface to a pen-based computing device.

For instance, how does a user generate an equivalent to a "right-mouse-button click" with a pen or stylus to obtain context sensitive help or context sensitive menus for a displayed underlying UI component? Since pens are often used to provide such models or devices with handwritten user input and (e.g., characters, numbers, commands glyphs, and so on), how do such devices provide for moving a displayed pointer or cursor across the display so that it lies over a desired insertion point or UI control? Traditional systems and techniques do not satisfactorily solve these problems to allow a user to easily and intuitively communicate with a program in such a model.

The following description, together with the drawings, addresses these and other problems of conventional UI design.

SUMMARY

Systems and methods for a user interface for stylus-based user input is described. In one aspect, a stylus-based user input is received. Responsive to receiving the input, a menu is displayed. The menu includes selectable items to allow a user, by selecting one of the selectable items, to direct the computer system to generate right-mouse button input or to interpret one or more subsequent stylus-based user inputs as hover cursor input, keyboard-like input, or handwriting input.

BRIEF DESCRIPTION OF THE DRAWINGS

The same numbers are used throughout the drawings to reference like features and components.

FIG. 2 shows aspects of the helper control action area (HAA), which is displayed onto a display device (e.g., a touch screen) where a user has interacted in a particular manner with the screen.

FIG. 4 further illustrates exemplary use stylus movements and selections that direct the behavior of the stylus helper control.

FIG. 5 shows exemplary program module architecture and data flow to provide a user interface for stylus-based user input.

DETAILED DESCRIPTION

The following description sets forth exemplary arrangements and procedures for providing a pen or stylus based user interface. The subject matter is described with specificity to meet statutory requirements. However, the description itself is not intended to limit the scope of this patent. Rather, the inventor has contemplated that the claimed subject matter might also be embodied in other ways, to include different elements or combinations of elements similar to the ones described in this document, in conjunction with other present or future technologies.

Overview

A user interface (UI) for computing devices that receive stylus or pen-based user input is described. The UI addresses problems (e.g., how to provide right-mouse-button clicks, cursor hovering, and so on) that arise when moving from a keyboard and/or mouse user input model to a pen-based user input model. To address these problems, the UI intercepts pen-based user input events before they are distributed to other applications (e.g., by an operating system (OS)). Each intercepted event is analyzed to determine if the event:

(a) represents a request to display (e.g., a continuous touch user input) a stylus helper control or menu, which allows a user to execute various tasks or modes of operation, each of which specify how a number of subsequent stylus-based input events are to be interpreted or handled (e.g., a right-mouse-button click, a hover cursor mode request, a keyboard-like input mode request, or a handwriting mode request);

(b) represents user selection of a task/mode of operation (e.g., a stylus un-touch event over a respective icon in the stylus helper control);

(c) represents stylus-based user input into an active stylus helper task;

(d) represents a request to dismiss a displayed stylus helper control or exit an active stylus helper task/mode of operation; or (e) represents user input (e.g., a quick stylus-touch event represents a left button click) that is to be immediately returned to the OS for regular distribution to any interested other applications.

Upon dismissal (user or automatic dismissal) of the stylus helper control without user selection a helper task, certain events or user input that caused the display and dismissal of the control are forwarded to the OS for distribution and regular processing by any interested other applications. Additionally, upon completion of a selected helper task, any results of the task (e.g., cursor coordinates, recognized handwriting, ASCII characters, a right-mouse-button click, mapped events, etc.) are communicated to an underlying program (e.g., a text input box in a Web browser) for processing.

An Exemplary System

Figure 1:
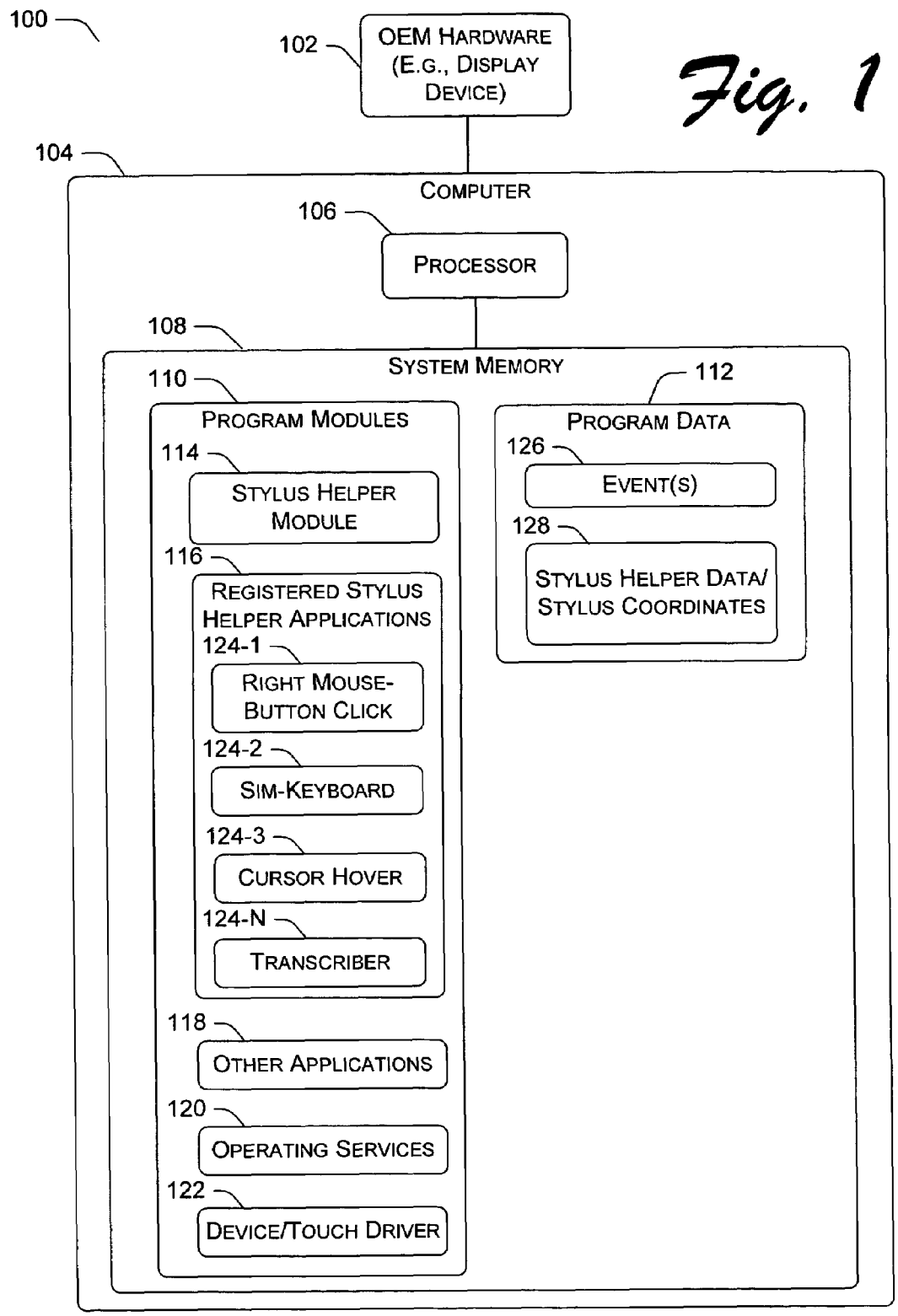
FIG. 1 shows an exemplary system to provide a user interface for stylus-based user input.

FIG. 1 illustrates an exemplary system 100 to provide a user interface for stylus or pen-based user input. The system includes a display device 102 (e.g., a touch-screen, digital pad, a monitor, a portable interactive display device, and so on) that is operatively coupled to a computing device 104. The computing device 104 is operational as any one of a number of various computing devices such as a PC, a server, a thin client, a thick client, a hand-held PDA, a portable interactive display, a digital tablet, a laptop device, a multiprocessor system, a set top box, programmable consumer electronics, a wireless phone, an application specific integrated circuit (ASIC), and so on.

The host computer includes a processor 106 that is coupled to a system memory 108. The system memory 106 includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory card, a CD-ROM, and so on.

The processor 106 is configured to fetch and execute computer program instructions from program modules 108; and configured to fetch data 112 while executing one or more of the program modules 110. Program modules typically include routines, programs, objects, components, data structures, and so on, for performing particular tasks or implementing abstract data types.

For instance, program modules 110 include the stylus helper module 114, registered stylus helper applications 116, other applications 118, an operating service module 120, and a device driver module 122. The stylus helper module 114 provides a UI for stylus-based input for a user to easily implement: (a) keyboard-like and/or mouse-like functionality with a stylus; (b) selection of another program's underlying UI controls; (c) right mouse clicks (e.g., to obtain context-sensitive help or menus); (d) cursor or "pointer" movement (i.e., cursor hovering) over another program's underlying UI components; (e) simple and quick access to software applications, operational modes; (e) etc.

To provide such a UI, the stylus helper module 114 displays and hides a stylus user input or stylus helper control, which is described in greater detail below in reference to stylus helper control 202 of FIGS. 2-4, based on user stylus-based user input. Such user input generates one or more events that are mapped to certain configurable responses. The stylus helper control 202 provides a quick and simple way for the user to interact with an underlying computer program's UI (e.g., provide keyboard-like and/or mouse-like input), invoke other tasks or modes of operation (e.g., a registered stylus helper application 116), and so on.

To accomplish these various functionalities, the stylus helper module 114 intercepts, analyzes, and directs touch screen 102 events (e.g., stylus press and movement events) before they are processed by the registered stylus helper applications 116; other applications 118, or operating services 120. Such intercepted, analyzed, and redirected events are described in greater detail below in reference to FIGS. 5-6, and TABLES 1-4.

Registered stylus helper modules 116 are computer applications that provide additional functionality to the stylus helper module 114. There are various ways that an application 116 may register with the stylus helper module 114, including, for example, by identifying a helper icon (e.g., the helper icons 402 of FIG. 4) to represent and access the application.

As discussed in greater detail below, helper icons are displayed in a helper action area 208 of the stylus helper control 202 of FIGS. 2-4. There can be any number and type of registered stylus helper modules 116.

In this example, the registered stylus helper modules 116 include the right-mouse button click module 124-1, the simulated keyboard input module 124-2, the cursor hover module 124-3, and the transcriber module 124-N. These additional functionalities of the registered stylus helper modules 116 are accessible via the stylus helper control 202 of FIGS. 2-4. Procedures to access stylus helper control 202 functionality and the additional functionalities of the registered stylus helper applications 116 are described in greater detail below in reference to FIGS. 2-5 and the stylus-based event to action mappings shown in TABLES 1-4.

The right-mouse button click module 124-1 provides a user with a simple and intuitive technique to generate a right-mouse-button click (e.g., to obtain context sensitive help corresponding to another computer program's underlying control, to perform some other action that is mapped by the underlying control's computer program application to the right-mouse button click, and so on) when the user is providing input with a stylus, rather than with a mouse or keyboard device. The technique to generate such a right-mouse-button click with a stylus is described in greater detail below in reference to right-mouse-click helper icon 402-1 of FIG. 4.

The simulated keyboard module 124-2 provides a user with a simple and intuitive technique (e.g., a keyboard-like graphic control (not shown) displayed on the touch-sensitive screen 102) to generate text, punctuation; escape characters, and so on, with a stylus. The procedure to instantiate the simulated keyboard module 124-2 is described in greater detail below in reference to the keyboard helper icon 402-2 of FIG. 4.

The cursor hover module 124-3 provides a user with a simple and intuitive technique to display and maneuver or drag a cursor over another program's underlying UI. This cursor hover movement is provided independent of sending any of the stylus-movement events corresponding to such maneuvering to any underlying UI controls. The procedure to instantiate the cursor hover task 124-3 is described in greater detail below in reference to cursor hover helper icon 402-3 of FIG. 4. Stylus-based event mapping to cursor hover mode-based actions are described in greater detail below in reference to TABLE 3.

The transcriber module 124-N provides a user with a simple and intuitive technique to provide interpreted handwritten input to an underlying computer program (e.g., a Web browser application) without being confined to a window that is provided by the underlying program. Instead, because the stylus helper module 114 intercepts stylus-based touch events, the user can scribble or handwrite over the top of an underlying program's UI without concern of accidentally invoking one of the underlying program's UI controls.

An exemplary procedure to instantiate the transcriber module 124-N is described in greater detail below in reference to transcriber helper icon 402-N of FIG. 4. An example of the use of the transcriber module 124-N is described in greater detail below in reference to FIG. 6. Stylus-based event mapping to transcriber-based actions are discussed in greater detail below in reference to TABLE 4.

The other applications 118 module includes, for example, a Web browser application, a word processor, and so on. Operating services 118 include, for example, an operating system such as any one of a number of various Microsoft Corporation WINDOWS operating systems (OS) or services (e.g., Windows CE® shell services).

An Exemplary Stylus Helper UI

Figure 2:
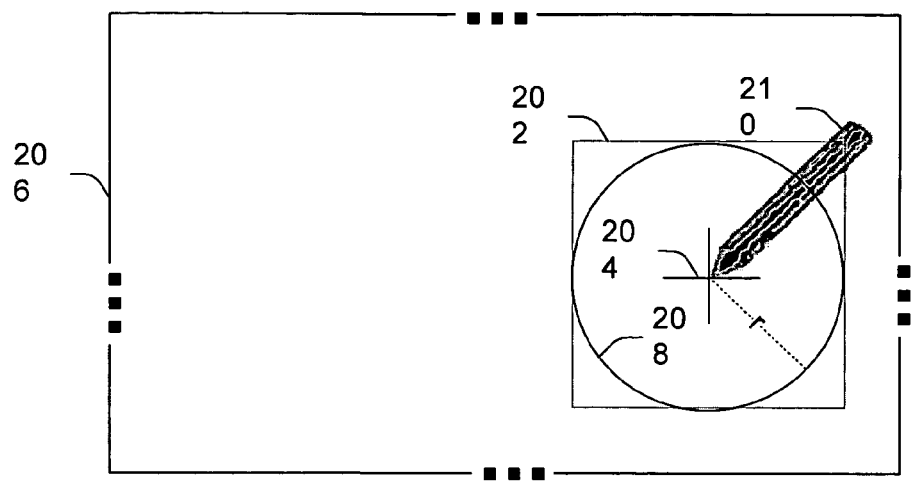
FIG. 2 shows an exemplary stylus helper control. Specifically.

FIG. 2 shows an exemplary menu 202 for a user interface for stylus-based user input. Hereinafter, the menu 202 is often referred to as the stylus helper control 202. Specifically, FIG. 2 shows that the exemplary stylus helper control 202 includes an optional indication 204 of where a user has "touched" the screen 206 of the display device 102 with a stylus 210. In this example, the optional indication 204 is a crosshair symbol 204. The crosshair 204, however, could be any of a number of other various symbols to identify where a user has "touched" the screen of the display device 102 with the stylus. Additionally, the term "touched" can indicate that the user has physically touched the screen 206 with the stylus. Alternatively, the term touched can indicate that the stylus has come into close proximity to the screen. In this alternative example, the screen and the stylus may include components that respectively indicate when the stylus is near a particular location on the screen.

The exemplary stylus helper control 202 further includes a stylus control helper action area (HAA) 208. In this example, the HAA 208 is a circle with a radius r that is centered on the crosshair 204. The HAA 208 can be a geometrical shape other than a circle 208 (e.g., a square, a triangle, etc.). Additionally, although this example shows the outline of the HAA 208 on the screen 206, the HAA 208 outline is optional and implementation specific (e.g., the implementation may depend on ease of differentiation between the control 202 and a particular program's underlying UI components, user feedback, and so on).

Figure 3:
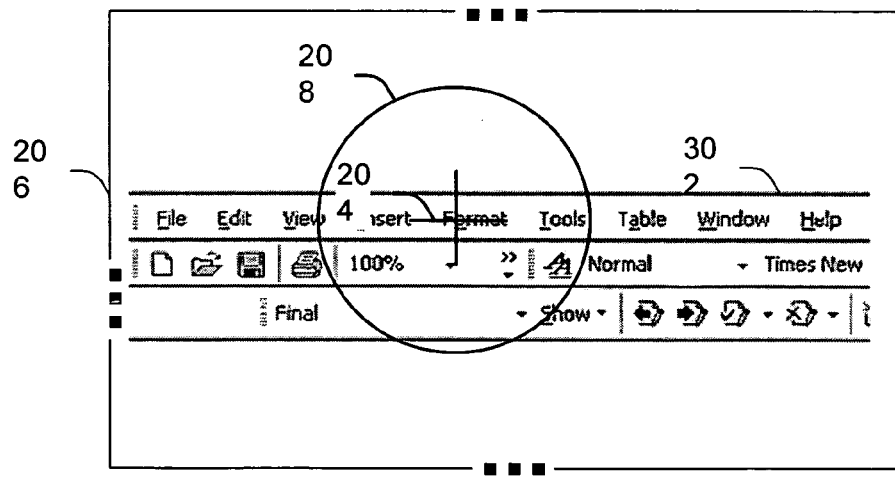
FIG. 3 shows the action area of a stylus helper control superimposed over a computer program's user interface.

FIG. 3 shows a stylus helper control 202 superimposed over a computer program's user interface 302. When a user touches the screen 206 at a location (e.g., location 204) with a stylus and holds the stylus at that location for a certain and configurable amount of time, the stylus helper module 114 displays the control 202 onto the screen 206. If components of another program's UI 302 underlie the location where the user has touched the screen 206, the stylus helper control 202 is superimposed over the other UI components 302. By superimposing the control 202 over any underlying UI components, the user is able to detect what is underneath the touch point 204.

Accordingly, the stylus helper control 202 allows a user to position the touch point 204 of the helper control 202 over another program's underlying control in a manner that allows the user to still view the underlying control. A control that underlies the touch point 203 typically has some operational context that may be implemented by the computer program that is managing the underlying control. However, the stylus helper menu 202 does not correspond to any underlying control's operational context.

For instance, consider that a right-mouse-button-click over a selected block of text in a word processing document typically results in a mouse-click event being communicated to the word processing program that manages the selected block of text. Responsive to receiving the event, the word processing program may display a context sensitive help menu corresponding to the selected block of text and offering action items such as "Cut", "Copy", "Paste", "Font" and "Paragraph". Thus, the conventional help menu of this example is not independent of the context of the underlying selected block of text. Rather, the conventional help menu directly corresponds to the operational context of the selected block of text (e.g., aspects of the underlying control).

In contrast to such conventional operating behavior, when the stylus menu 202 is displayed over an underlying UI control, the menu 202 is independent of the underlying object's corresponding context of operation. To achieve such independence, the stylus helper module 114 intercepts any stylus-based user input, including any input resulting in the display of menu 202, such that the particular computer program that manages the underlying control will not receive the user input-unless the stylus module 114 subsequently causes the event to be forwarded to the particular program. (Until such user input is forwarded, the particular program cannot generate or present any contextually relevant information (e.g., a context sensitive help menu) corresponding to a control that underlies the stylus menu 202). Thus, the stylus menu 202 is independent of any underlying object's corresponding context of operation.

Figure 4:
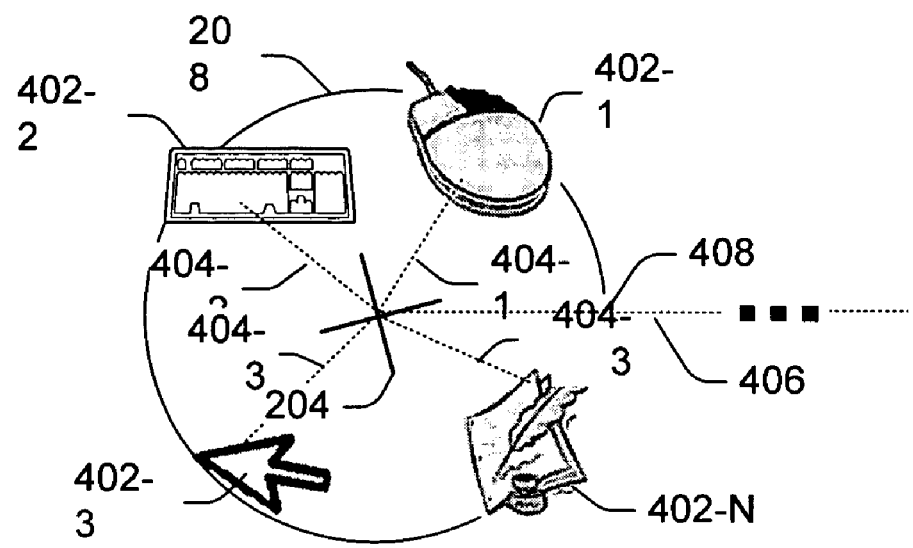
FIG. 4 shows an exemplary stylus control, wherein the helper action area includes of a number of helper icons representing tasks or modes of operation that are accessible via the stylus control.

FIG. 4 shows an exemplary stylus helper action area (delimited by the circle 208) comprised of a number of helper icons 402 to represent and facilitate access to one or more of the registered stylus helper applications 116 of FIG. 1. There can be any number of helper icons 402, text, and so on, displayed on the periphery of the HAA 208. In this example, the helper icons 402 allow a user to specify that the computer system 100 of FIG. 1 is to interpret one or more subsequent stylus-based user input events as a mouse-right-button click event, hover cursor events, keyboard-like events, or handwriting events.

For instance, helper icon 402-1 is mapped to the right mouse-button click module 124-1 of FIG. 1 to provide a "right mouse-button click" action. Helper icon 402-2 is mapped to the sim-keyboard module 124-2 to display a keyboard for a user keyboard-like input with a pen. Helper icon 402-3 is mapped to cursor hover module 124-3 of FIG. 1 to provide a "cursor hover" mode of operation, wherein a pointer or cursor can be dragged with the pen to various screen 206 locations, and dropped at any one or more of those locations. Helper icon 402-N is mapped to the transcription computer program 124-N for entering a handwriting recognition mode of operation, wherein pen-strokes on the display are interpreted as handwriting input rather than selections, mouse hovering actions, and so on.

By "touching" the screen 206 with a stylus at a location (e.g., location 204) and holding the stylus at that location for a certain amount of time, the helper UI 202 is displayed. To instantiate a program or mode represented by an icon 402, the user moves the stylus from location 204 towards an icon 402 (indicating a desired task) without removing the stylus from the screen 206. Dotted lines 404 indicate stylus movement from location 204 to a position on the screen 206 that overlies or intersects one of the displayed icons 402. Upon reaching a point on the screen 206 that overlies or intersects one of the icons 402, the user lifts the stylus to perform the action or enter the mode of operation indicated by the underlying icon 402. In this manner, the stylus helper UI 202 provides a quick way for the user to invoke actions and/or enter modes of operation with the stylus.

The stylus helper module 114 provides these and other aspects of the helper control UI 202 by mapping events (e.g., user touch events, stylus lifting events, timer expiration, user stylus drag events, and so on) to particular helper control 202 behavior, registered stylus helper application 116 functionality, and so on. Examples of stylus-based events that are mapped to specific helper control 202 or registered helper application 124 behaviors are described in greater detail below in reference to TABLES 1-4.

The stylus helper module 114 provides a number of techniques for a user to dismiss or hide the stylus helper UI 202. One way for a user to hide the helper UI 202, for example, is by dragging the stylus beyond the HAA 208 without selecting one of the helper tasks/modes indicated by a respective icon 402. To illustrate this, consider that the user drags the stylus from point 204 and across the screen 206, as indicated by dotted line 406. Immediately after the user drags the stylus past the point 408 on the screen, which represents the intersection of path 406 with the outer perimeter of the HAA 208, the stylus helper module 114 hides the helper control 202. This path 406 extending beyond the HAA 208, which causes the dismissal of the control 202, can be over any portion of the control 202, including directly over any of the displayed icons 402.

Additionally, the stylus helper module 114 will dismiss the helper control 202 if the user does not select one of the tasks 402 within a particular amount of time from control 202 instantiation (i.e., after the helper control 202 has been displayed).

An Exemplary Program Module Architecture and Data Flow

Figure 5:
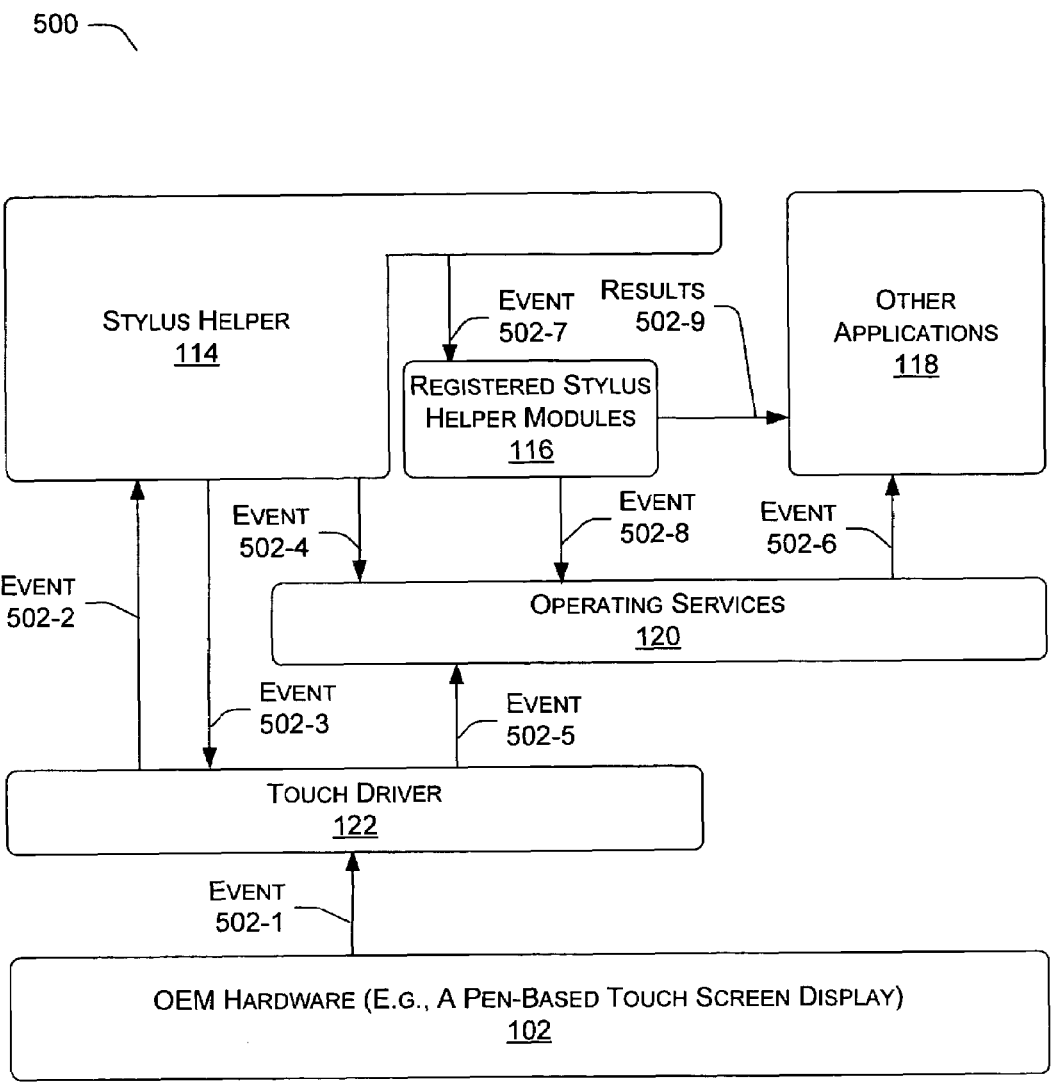
FIG. 5 shows exemplary program module architecture and data flow to allow a user to specify that certain stylus-based user input events are to be interpreted as a mouse-right-button click event, hover cursor events, keyboard-like events, or handwriting events. Specifically.

FIG. 5 shows exemplary program module architecture and data flow to provide a stylus helper user interface. The touch driver module 122 includes one or more device drivers (e.g., a touch-screen driver to detect and translate user pen-based input from the display device 102, a mouse driver, a keyboard driver, etc.) to translate and communicate user input to a program such as the stylus helper module 114 or operating services 120.

For instance, when the touch driver 122 receives stylus or pen-based user input from the display device 102 (e.g., the touch screen 206 of FIG. 2), the driver 122 communicates the corresponding event(s) to the stylus helper module 114 (i.e., see the events 126 of FIG. 1). Such touch driver 122 events include interactions between a stylus and the display 102 (e.g., stylus/screen touch-events, stylus lifting events, stylus drag events, and so on). The stylus helper module 114 processes these communicated events before they are optionally passed to other computer programs such as one or more of the registered stylus helper modules 116, the operating services 120 (i.e., the system), and so on, for further processing (i.e., transforming the events mouse-like events to be communicated to any number of the other applications 118).

Lines 502 that are capped with direction arrows represent data or event flow between the various program modules 108. A screen device 102 that is receptive to stylus-based user input generates a signal or event responsive to such input. This signal is communicated, as shown by arrow 502-1, from the OEM hardware 102 to the touch-screen display driver 122. The touch driver 122 forwards this event, as shown by arrow 502-2) to the stylus helper module 114 for further processing. The stylus helper module 114 analyzes the forwarded event to determine if it is mapped to a stylus control 202 or a registered stylus helper 116 action or behavior. These mappings are described in greater detail below in reference to TABLES 1-4. If such a mapping exists, then the mapped action(s) is/are performed.

The stylus helper module 114 may then communicate the intercepted event 122 (see, line 502-2), or another event that is mapped to the intercepted event, (a) back to the touch driver 122 (e.g. arrow 503-3); (b) to the operating services 120 (e.g. line 503-4); or, (c) to one or more of the registered stylus helper modules 116 (e.g., line 508-7) for additional processing. Where the stylus helper 114 communicates the analyzed event back to the touch driver (e.g., 502-3), the touch driver will forward the event (e.g. arrow 503-5) to the operating services 120. In either case, responsive to receiving the forwarded event, the operating services 120 communicates a corresponding event or message (e.g., right or left button clicks, mouse move messages, button-up messages, and so on) to any other applications 118 that have indicated interest in such events (e.g., arrow 502-6).

When the stylus helper module 114 communicates the intercepted event to one or more of the registered stylus helper modules 116, the receiving module(s) will process the event according to its particular implementation. The particular implementation of a registered stylus helper module 116 may (or may not) result in the communication of the intercepted event or a different event that was mapped to the intercepted event, to the operating services (i.e., line 503-8).

For instance, consider that the event is a stylus lift event over a location that intersects the right-click helper icon 402-1 of FIG. 4. The event is forwarded by the touch driver 102 to the stylus helper module 114 (see, lines 502-1 and 502-2). The stylus helper module 114 determines that the event should be forwarded to the right-mouse-button click module 124-1 of FIG. 1 (see, line 503-7). Responsive to receiving the forwarded event, the click module 124-1 generates a "right-mouse-button click" event or message, which includes the location (e.g., stylus helper data/stylus coordinate information 126 of FIG. 1), to operating services 120 for communicating to any interested other applications 118 (an "interested" other application 118, in this case, is an application that processes right-mouse-button click events or messages). In this manner, a user can easily generate a right-click with a stylus input device.

Moreover, a registered stylus helper module 116 may communicate data (e.g., mouse or pointing device coordinates, handwriting or interpreted handwriting data, a right-mouse-button click event, ASCII text, punctuation or number, and so on) corresponding to its particular implementation directly to one or more of the other applications 118. Such data or task result communication between modules 108 is represented by line 502-9.

Table 1 illustrates an exemplary mapping between stylus-based touch events and helper control 202 and/or registered stylus helper application 116 behavior.

TABLE 1

EXAMPLES OF EVENT/ACTION MAPPING

| Row | Stylus/Touch Screen 102 Event(s) | Stylus Helper Module 114 Timer Event | Events Generated by User Interaction with the Stylus Helper Control 202 | Stylus Helper Module 114 Action | Operating Services 120 Action |
|---|---|---|---|---|---|
| 1 | single quick touch | expired/not expired | none | no action | left mouse button click |
| 2 | double quick touch | expired/not expired | none | no action | left mouse button double click |
| 3 | continuous touch and no movement (touch and hold) | not expired | none | show stylus helper (active) | none |
| 4 | | expired | none | hide stylus helper | left mouse button down |
| 5 | moving continuous touch after stylus helper is active | not expired | inside stylus helper area and over a particular icon | show stylus helper with highlighted icon, indicating selection | none |
| 6 | | | outside stylus helper area | hide stylus helper | left mouse button down and mouse move event(resulting in dragging, highlighting, inking, etc.) |
| 7 | | expired | none | hide stylus helper | left mouse button down and mouse move event (resulting in dragging, highlighting, inking, etc.) |
| 8 | untouched, after any continuous touch and stylus helper is still active | not expired | inside stylus helper area and not over a particular icon | hide stylus helper | Left mouse down and left mouse button up |
| 9 | | | inside stylus helper area and over a particular icon | hide stylus helper | Handle particular action (refer to table 2) |

TABLE 1-continued

EXAMPLES OF EVENT/ACTION MAPPING

| Row | Stylus/Touch Screen 102 Event(s) | Stylus Helper Module 114 Timer Event | Events Generated by User Interaction with the Stylus Helper Control 202 | Stylus Helper Module 114 Action | Operating Services 120 Action |
|---|---|---|---|---|---|
| 10 | any touch when stylus helper is not active | n/a | n/a | n/a | corresponding mouse event |

Col. 1 of Table 1 identifies user instantiated events between a stylus and a touch screen 102. Col. 2 of Table 1 identifies a timer status (e.g., expired, not expired, N/A). The stylus helper module 114 starts, monitors, and maintains the timer. Specifically, the timer is started when a user invokes the stylus helper control 202. The timer is stopped or killed when a predetermined amount of time has expired without any user interaction with the helper control. The timer is also killed in response to certain user actions, as described in greater detail below.

Col. 3 identifies stylus helper module 114 based events that are generated responsive to direct user interaction with aspects of the stylus helper control 202. Col. 4 identifies any action that is taken by the stylus helper module 114 responsive to any of the events identified in cols. 1-3. Col. 5 identifies actions that may be performed by the system 120 responsive to the stylus helper module 114 causing an event or message, which may or may not be the exact event identified in cols. 1-4, to be communicated to the system 120.

As indicated by cols. 1-5, row 1, responsive to a single quick touch of a stylus to a touch screen 102, the stylus helper module 114 takes no action other than to return the intercepted event back to the touch driver 122 or to the system 120, whereupon it may be generated into a left-mouse-button click that is communicated to the other applications 118.

Row 2 shows that responsive to a double quick touch of the display screen 102, the stylus helper module 114 takes no action other than to forward the event back to the touch driver 122 or to the system 120, whereupon it may be generated into a left-mouse-button double-click that is communicated to the other applications 118.

Rows 3 and 4 of Table 1 correspond to continuous non-moving touch events. Row 3 shows that a continuous non-moving touch event causes the stylus helper module 114 to present the stylus helper control 202 of FIGS. 2-4. However, row 4 of Table 1 shows that if a time-to-display timer (started by the stylus helper module 114 when it displays the control 202) expires (e.g., because the user has not selected a helper icon 402, moved the stylus out of the HAA 208, etc.) the helper module 114 will hide the helper control 202 and communicate an event to the touch driver 122 or to the system 120. The system 120 upon receipt of the communicated event causes a left button down event identifying the location where the control 202 had been centered (i.e., location 204) to be forwarded to any interested other applications 118. The time-to-display timer is stopped as soon as the user either selects an icon 402 or moves the stylus out of the HAA 208.

Rows 5-7 of Table 1 correspond to continuous moving touch events after the stylus helper control 202 is active. Row 5 shows that a continuous moving touch event causes the stylus helper module 114 to present the stylus helper control 202 to highlight a particular icon 402. However, row 6 of Table 1 shows that the stylus is moved beyond the HAA 208 of the control 202: (a) the stylus helper module 114 will hide the control 202 and communicate the event to the touch driver 122 or to the system 120; and (b) responsive to receiving the event, the system 120 causes a left button down event and mouse move messages to be forwarded to any interested other applications 118.

Row 7 shows that after displaying the helper control UI 202 responsive to detecting continuous moving touch events, if a time-to-display timer (started by the stylus helper module 114 when it displays the control 202) expires because the user has not selected a helper application 402, moved the stylus out of the HAA 208, etc: (a) the helper module 114 will hide the helper control 202 and communicate the event to the touch driver 122 or to the system 120; and (b) responsive to receiving the event, the system 120 causes a left button down event and mouse move messages to be forwarded to any interested other applications 118.

Row 8 of Table 1 indicates that if the user lifts the stylus at any time from the display screen 102 when the stylus helper control 202 is displayed or active (i.e., the stylus was not positioned over an icon 402 when the stylus was lifted from the screen, the stylus is still positioned in the HAA 208, etc.), that the stylus helper module 114 will hide the helper control 202 and communicate the event to the touch driver 122 or to the system 120 such that a left-mouse-button down and up event is forwarded by the system 120 to any interested other applications 118. Row 9 indicates that if a stylus is positioned over an icon 402, when the stylus is lifted from the screen the stylus helper 114 activates the appropriate helper module 116 to handle a corresponding task.

Row 10 of Table 1 indicates that any touch event of the stylus to the screen 206 when the stylus helper control 202 is not active that did not result in the selection of a task represented by a displayed icon 402 (e.g., a stylus lift event over an icon causing a corresponding task or mode and the dismissal of the helper control 202), results in a corresponding mouse event being communicated by the system 120 to any interested other application 118.

TABLE 2

EXAMPLES OF EVENT/ACTION MAPPING

| Events Generated by User Interaction with the Stylus Helper Control 202 | Stylus Helper Module 114 Action | Operating Services 120 Action |
|---|---|---|
| Stylus helper control action area tasks/modes include, for example:<br>(a) right click task;<br>(b) cursor hover mode;<br>(c) keyboard task; and<br>(d) any other user/OEM tasks/modes/macros; | hide stylus helper | Touch events generated within a helper control 202 may not be translated into equivalent system mouse events. Rather, the stylus helper 114 may map any event sent to the touch driver 122 or system 120 based on the selected task's/mode's functionality. For instance, the tasks/modes (a-e) in col. 1 are mapped to corresponding events/actions (a-e) in this column.<br>(a) right button click;<br>(b) provides hover cursor; the user can use this cursor to perform click and drag functionality; it expires after a timer expires w/ no action, or dismiss when user lifts off the icon.<br>(c) pop up software input mechanism;<br>(d) E.g., a handwriting transcriber mode with a displayed transcriber indicator, and so on. |

Col. 1 of Table 2 identifies further stylus helper module 114 based events (i.e., events that are generated responsive to direct user interaction with aspects of the stylus helper control 202). Col. 2 identifies further action that is taken by the stylus helper module 114 responsive to any of the events identified in col. 1. Col. 3 identifies actions that may be performed by the system 120 responsive to the stylus helper module 114 causing an event, which may or may not be the event identified in col. 1 to be communicated to the system 120.

In the example of FIG. 4, the helper control 202 includes a number of helper icons 402 such as the right-mouse-button click icon 402-1, the simulated keyboard icon 402-2, the cursor hover operational icon 402-3, and the handwriting transcription icon 402-N, and so on. Responsive to user selection of any of these or other icons 402 shown in the HAA 206 (i.e., instantiating the control 202 at some location on the screen 206, dragging the stylus from the location to intersect one of the corresponding task/mode icons 402, and lifting the stylus off of the screen 206—touch events 122 of FIG. 1), the stylus helper module 114 hides the control 202 and instantiates a corresponding registered stylus helper application 116 of FIG. 1.

TABLE 3

EXAMPLE OF HOVER MODE MAPPED EVENTS AND ACTIONS

| | Touch Screen Event | Hover UI | System Action |
|---|---|---|---|
| 1 | single/double quick touch outside Hover UI | active | left mouse click/double click |

TABLE 3-continued

EXAMPLE OF HOVER MODE MAPPED EVENTS AND ACTIONS

| | Touch Screen Event | Hover UI | System Action |
|---|---|---|---|
| 2 | single quick touch inside Hover UI | hide UI and exit hover | none |
| 3 | continuous touch | active | no mouse button down, only send mou moves |

Table 3 shows cursor hover mode 124-3 of FIG. 1 action to event mappings that are made by the stylus helper module 114 once a user has selected the cursor hover icon 402-3 of FIG. 4. Upon hover mode 124-3 activation, a cursor is displayed onto the screen 102. Row 1 of Table 3 indicates that a single/double quick touch hover UI causes the stylus helper module 114 to communicate a left mouse click/double click to the touch driver 122 or to the system 120. Row 2 of Table shows that a single quick touch event causes the stylus helper module 114 to hide any hover UI and exit the hover mode (i.e., exit the hover task 124-3).

Row 3 of Table 3 corresponds to a continuous touch of the stylus on the screen 102 when the Hover module 124-3 is active. Responsive to such a continuous touch on the displayed cursor, the hover module 124-3 translates the continuous touch to mouse moves, moving and manipulating the hover cursor.

TABLE 4

EXAMPLE OF TRANSCRIBER TASK MAPPED EVENTS AND ACTIONS

| Touch Screen Event | Transcriber Indicator Selected | Transcriber Indicator UI | System Action |
|---|---|---|---|
| any touch event, except for single quick touch | n/a | Visible | Transcriber transformed touch events into mouse and keyboard events |
| single quick touch | Yes | Hide and exit transcriber mode. | None |

Table 4 shows transcriber task 124-N of FIG. 1 stylus-based input event to action mappings. The stylus helper module 114 and/or the transcriber task 124-N perform the actions corresponding to these mappings once a user has activated the transcriber task 124-N via the helper icon 402-N of FIG. 4. Specifically, row 1 shows that once a transcriber icon 402-N is selected, the stylus helper control 202 communicates any touch-event, with the exception of a single quick touch event, to the transcriber task 124-N.

Row 2 shows that a single quick touch event causes the stylus helper module 114 to hide any transcription indication UI and exit the transcriber mode (i.e., exit the transcriber task 124-N). Because the stylus helper module 114 does not communicate any stylus-based input events to the operating services module 120 when the transcriber task 124-N is active, the stylus helper module 114 enables a user of the transcription task to scribble or handwrite over a different program's UI without causing any stylus-based handwriting events (i.e., those events generated during the generation of the handwriting) to be communicated to the different program.

Figure 6:
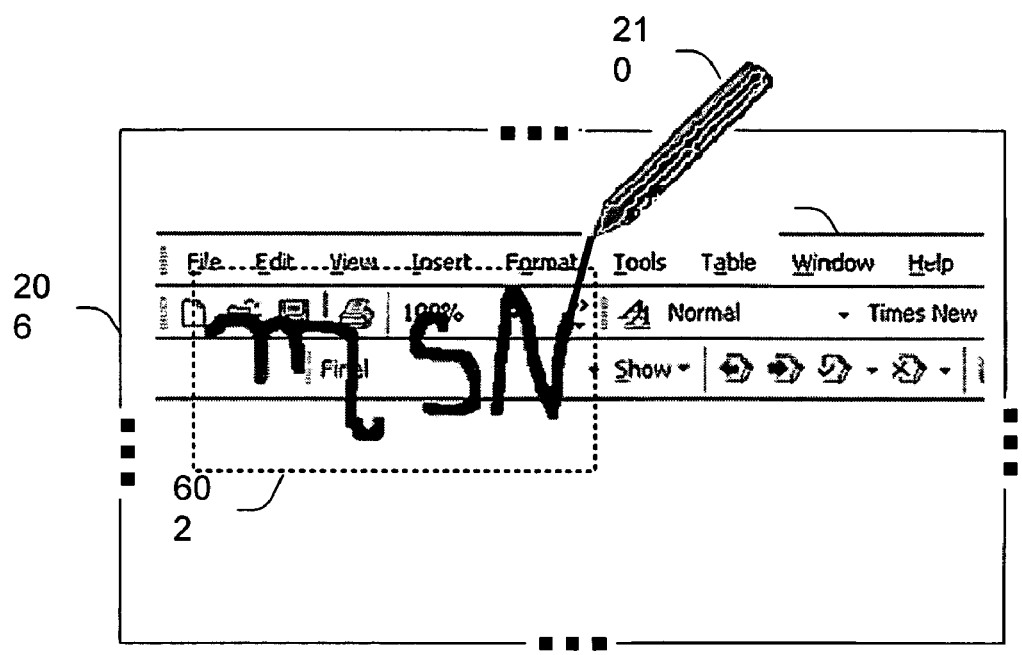
FIG. 6 shows an example of how, once a transcriber application is activated with the stylus helper UI, that a user can scribble or handwrite over a different program's UI without causing any stylus-based handwriting events (i.e., those events generated during the generation of the handwriting) to be communicated to the different program.

FIG. 6 shows an example of the use of the stylus helper control 202 to implement a handwriting recognition application 124-N. Specifically, once the transcriber application 124-N is activated via the stylus helper control 202 (e.g., see stylus path 404-3 to helper icon 402-N of FIG. 4), the helper control 202 is hidden by the stylus helper 114 module. At this point, the stylus helper module 114 is in a transcriber operating mode. The user can scribble or handwrite 602 over a different program's UI 604 using stylus 210. All stylus-based handwriting events (i.e., those events generated during the generation of the handwriting) are intercepted by the stylus helper module 114 and communicated to the transcriber application 124-N. Whether or not any stylus-based handwriting events (i.e., those events generated during the generation of the handwriting) are communicated back to the touch driver 122 or directly to operating services 120 for distribution to other applications 118 is optional and based on the particular implementation of the transcriber module 124-N.

An Exemplary Procedure

Figure 7:
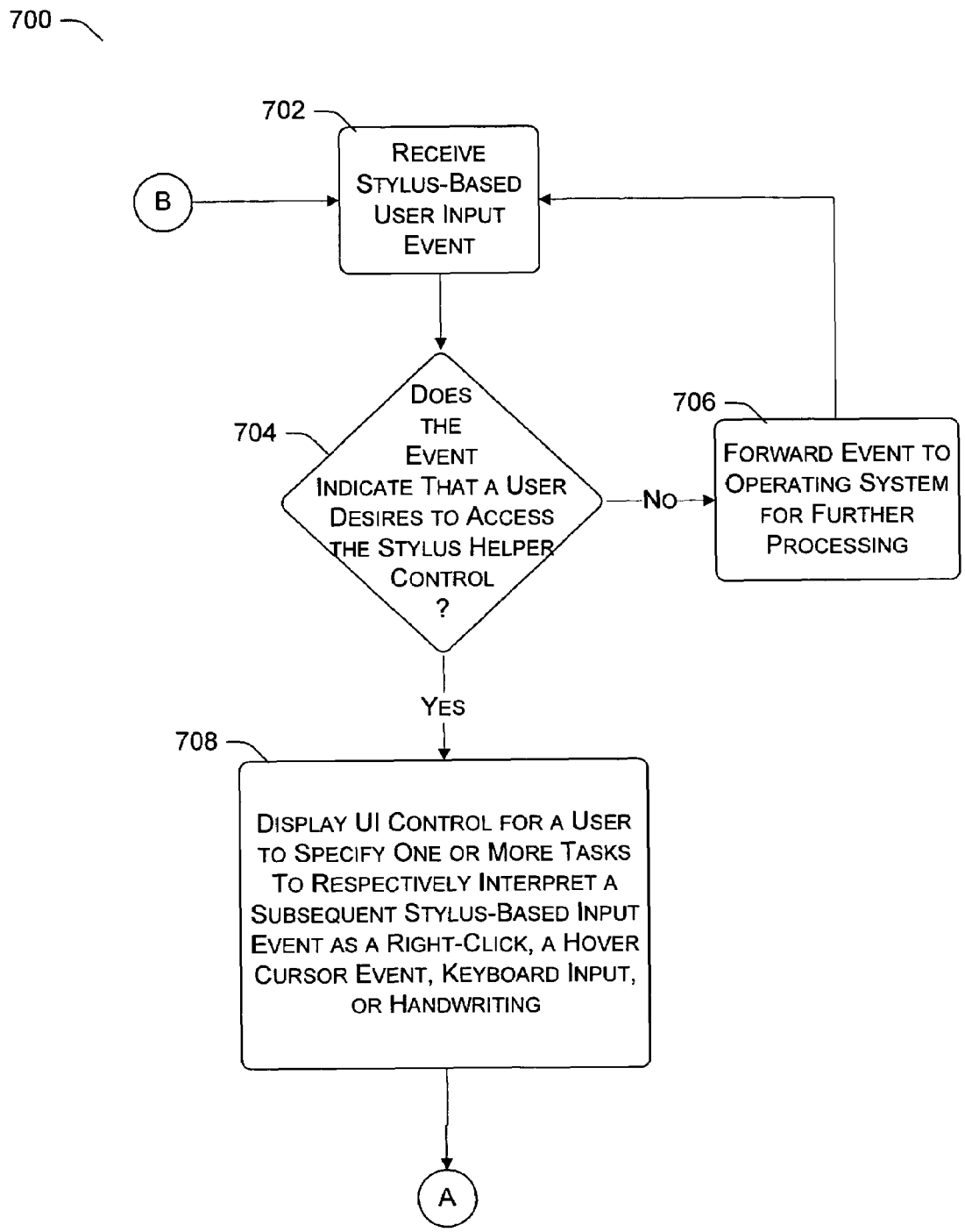
FIG. 7 shows an exemplary procedure for implementing a user interface for stylus-based user input.

FIG. 7 shows an exemplary procedure 700 for implementing a user interface for stylus-based user input (i.e., the user interface provided by the stylus helper module 114 of FIG. 1). At block 702, stylus-based user input is received. At block 704, the procedure determines if the input indicates that the user desires to access the stylus helper control 202 of FIGS. 2-4. There are various ways for the user to provide such as indication. For instance, as shown in Table 1, a continuous touch event causes the stylus helper module 114 to display the helper control 202.

At block 706, it having been determined at block 704 that the user does not desire to access the control 202 (e.g., by providing quick single or double touch events), the received event (block 702) is forwarded to the operating system for processing (e.g., for subsequent distribution to any interested other applications 118). Otherwise, at block 708, the stylus helper module 114 displays the stylus helper control 202; this includes a number of helper icons 402 that allow the user to determine how subsequent stylus-based input is to be processed. The procedure 700 continues at reference "A", which corresponds to block 802 of FIG. 8.

Figure 8:
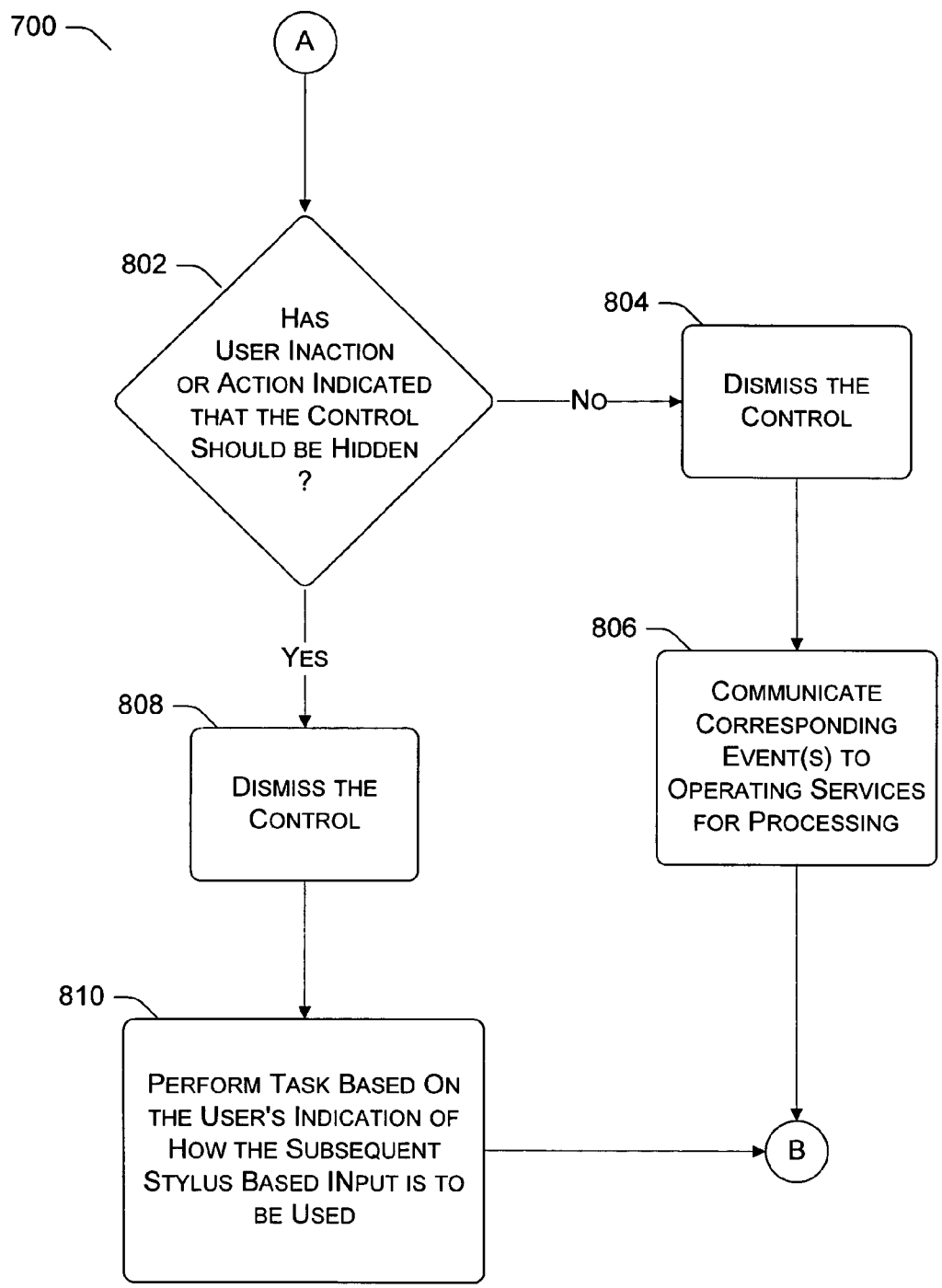
FIG. 8 shows further aspects of an exemplary procedure for implementing a user interface for stylus-based user input.

FIG. 8 shows further aspects of an exemplary procedure 700 for implementing a stylus helper user interface (i.e., the user interface provided by the stylus helper module 114 of FIG. 1). At block 802, the procedure determines if the stylus helper control 202 should be dismissed or hidden because of user action or inaction that has not resulted in the instantiation of a task corresponding to one of the displayed helper icons 402. If so, at block 804, the procedure dismisses the control 202.

There are a number of user actions or inactions that do not result in the instantiation of a task corresponding to one of the displayed helper icons 402. For instance, if the control 202 has been displayed for a predetermined amount of time without any user selection of one of the helper icons 402, the procedure (i.e., block 804) hides the control 202. Additionally, if the user lifts the stylus from the control 202 without selecting one of the helper icons 402, the control 202 is hidden. Additionally, if the user moves the stylus out of the control's action area 208, the control 202 is dismissed.

At block 806, the procedure communicates any event(s) corresponding to the display and dismissal of the control 202 to the operating services 120 for further processing (e.g., distribution to other applications 118). Such event that are communicated to the operating services 120 are listed above in the last column of Table 1. The procedure continues at "B", which is represented by block 702 of FIG. 7.

At block 802, if the procedure determines that the user has selected a task corresponding to one of the displayed helper icons 402, the procedure continues at block 808, where the control is also hidden. At block 810, the procedure performs the task corresponding to the helper icon 402 that was selected by the user. The procedure continues at "C", which is represented by block 902 on FIG. 9.

Figure 9:
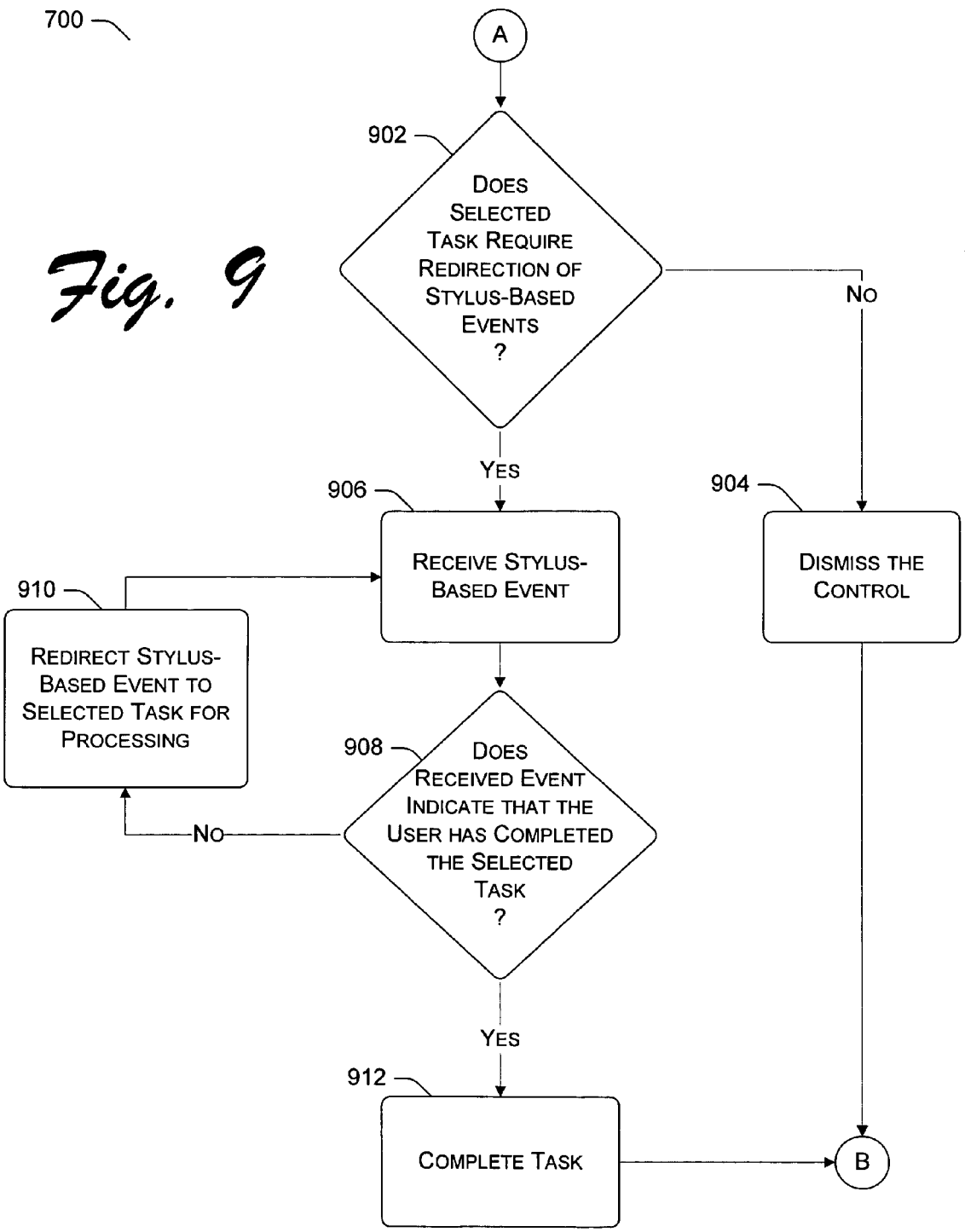
FIG. 9 shows further aspects of an exemplary procedure for implementing a user interface for stylus-based user input.

FIG. 9 shows further aspects of an exemplary procedure 700 for implementing a stylus helper user interface (i.e., the user interface provided by the stylus helper module 114 of FIG. 1). At block 902, the procedure determines whether the selected task (block 802 of FIG. 8) requires re-direction of stylus-based user input to the task. For instance, if the selected task is the right-mouse-button click task 124-1 that corresponds to the helper control 402-1 of FIG. 4, the stylus helper module 114 or the task 124-1 communicates a right-mouse-button event/message to the operating services 120 for further distribution to any interested other applications 118. Thus, in this example, subsequent stylus-based events do not need to be forwarded to the selected task.

However, if the selected task were the keyboard task 124-2, the cursor hover task 124-3, the transcribe task 124-N, or the like, the events need to be communicated to the selected task for further processing. For instance, the hover cursor module 124-3 uses the subsequent stylus-based input to calculate new screen 102 coordinates to move the cursor or pointer across the user interface. In another example, the simulated keyboard task 124-2 uses the subsequent stylus-based input to determine which keys a user has selected. In yet another example, the "transcribe" or handwriting recognition task 124-N uses the subsequent stylus-based input to identify and analyze user handwriting.

Accordingly, at block 904, the procedure having determined that the selected task (block 802 of FIG. 8) does not require re-direction of stylus-based user input, dismisses the control 202. The procedure 700 continues at "B", represented by block 702 of FIG. 7.

At block 906, the procedure receives stylus-based input (the procedure having determined at block 902 that the selected task (block 802 of FIG. 8) requires re-direction of stylus-based user input). At block 908, the procedure determines if the received event (block 906) indicates or signals that the user is done with the selected task. For instance, when the task is the hover task 124-3 or the transcribe task 124-N, the signaling event may be a quick single or double click anywhere on the screen 102. Or, when the task is the keyboard task 124-2, the signaling event may correspond to a location on the screen other than where the graphic of the keyboard is displayed.

At block 910, the event having been determined to not signal the task completion, the event is redirected to the selected task 124 for processing. At block 912, the event having been determined to signal that the user is finished with the task 124, the task is completed. A task can be completed in a number of different ways, each dependent on the task. For instance, if the task is the transcribe task 124-N, this block 912 of the procedure can indicate that any handwriting that was scribbled on the display 102 is to be interpreted and the results sent to an underlying program such as a Web browser. If the task was the hover task 124-3, the position or coordinates of the cursor on the display 102 may be identified and communicated to another program. The program receiving the cursor coordinates may decide to highlight or activate a UI control that is positioned at corresponding coordinates.

Accordingly, at block 912, there are a number of various ways that the procedure 700 can complete the task. The procedure 700 continues at "B", represented by block 702 of FIG. 7.

An Exemplary Suitable Computing Environment

Figure 10:
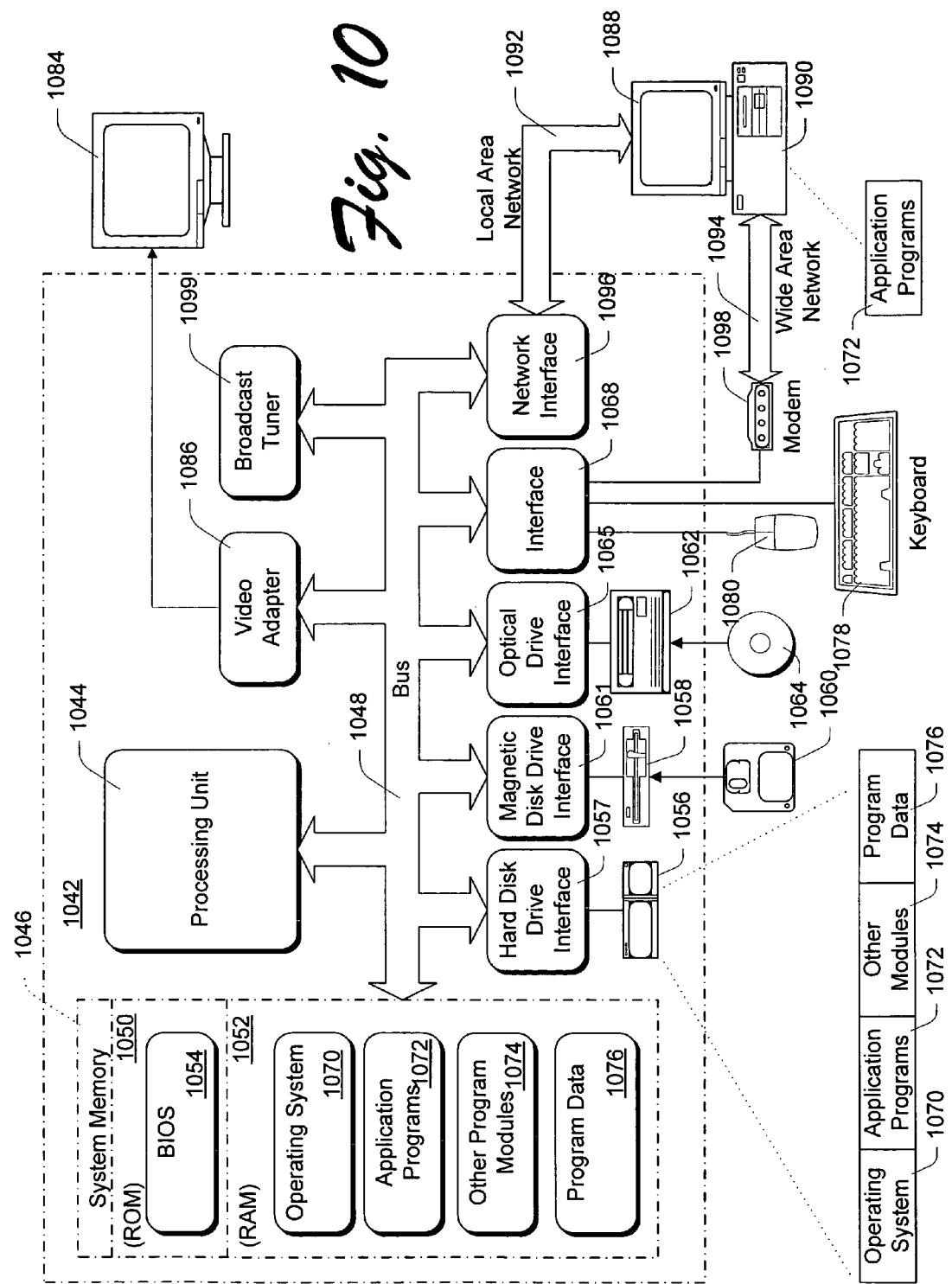
FIG. 10 illustrates aspects of an exemplary suitable operating environment in which a user interface for stylus-based user input may be implemented.

FIG. 10 illustrates aspects of an exemplary suitable operating environment in which a stylus helper user interface may be implemented. The illustrated operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, portable interactive display devices, PDAs, digital tablets, multiprocessor systems, microprocessor-based systems, programmable consumer electronics (e.g., digital video recorders), gaming consoles, cellular telephones, network PCs, minicomputers, mainframe computers, distributed computing environments that include any of the above systems or devices, and so on.

FIG. 10 shows a general example of a computer 1042 that can be used in accordance with the described arrangements and procedures. Computer 1042 is shown as an example of a computer in which various embodiments of the invention can be practiced, and can be used to implement, for example, a computing device 104 of FIG. 1, a display device 102, a stylus helper module 114, registered stylus helper applications 116, other applications 118, operating services 120, and device/touch driver 122, and so on. Computer 1042 includes one or more processors or processing units 1044, a system memory 1046, and a bus 1048 that couples various system components including the system memory 1046 to processors 1044.

The bus 1048 represents one or more of any of several types of bus structures, including a memory bus or memory controller, a peripheral bus, an accelerated graphics port, and a processor or local bus using any of a variety of bus architectures. The system memory 1046 includes read only memory (ROM) 1050 and random access memory (RAM) 1052. A basic input/output system (BIOS) 1054, containing the basic routines that help to transfer information between elements within computer 1042, such as during start-up, is stored in ROM 1050. Computer 1042 further includes a hard disk drive 1056 for reading from and writing to a hard disk, not shown, connected to bus 1048 via a hard disk drive interface 1057 (e.g., a SCSI, ATA, or other type of interface); a magnetic disk drive 1058 for reading from and writing to a removable magnetic disk 1060, connected to bus 1048 via a magnetic disk drive interface 1061; and an optical disk drive 1062 for reading from and/or writing to a removable optical disk 1064 such as a CD ROM, DVD, or other optical media, connected to bus 1048 via an optical drive interface 1065.

The drives and their associated computer-readable media provide nonvolatile storage of computer readable instructions, data structures, program modules and other data for computer 1042. Although the exemplary environment described herein employs a hard disk, a removable magnetic disk 1060 and a removable optical disk 1064, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 1060, optical disk 1064, ROM 1050, or RAM 1052, including an operating system 1070, one or more application programs 1072, other program modules 1074, and program data 1076. A user may enter commands and information into computer 1042 through input devices such as a stylus 210 of FIG. 2, a keyboard 1078, and pointing device 1080. Other input devices (not shown) may include a microphone, joystick, game pad, satellite dish, scanner, or the like. These and other input devices are connected to the processing unit 1044 through an interface 1068 that is coupled to the system bus (e.g., a serial port interface, a parallel port interface, a universal serial bus (USB) interface, etc.). A stylus input sensitive monitor 1084 (e.g., a touch-sensitive monitor) or other type of display device is also connected to the system bus 1048 via an interface, such as a video adapter 1086. In addition to the monitor, personal computers typically include other peripheral output devices (not shown) such as speakers and printers.

Computer 1042 operates in a networked environment using logical connections to one or more remote computers, such as a remote computer 1088. The remote computer 1088 may be another personal computer, a server, a router, a network PC, a peer device or other common network node, and typically includes many or all of the elements described above relative to computer 1042, although only a memory storage device 1090 has been illustrated in FIG. 10. The logical connections depicted in FIG. 10 include a local area network (LAN) 1092 and a wide area network (WAN) 1094. Such networking environments are commonplace in offices, enterprise-wide computer networks, intranets, and the Internet. In certain embodiments of the invention, computer 1042 executes an Internet Web browser program (which may optionally be integrated into the operating system 1070) such as the "Internet Explorer" Web browser manufactured and distributed by Microsoft Corporation of Redmond, Wash.

When used in a LAN networking environment, computer 1042 is connected to the local network 1092 through a network interface or adapter 1096. When used in a WAN networking environment, computer 1042 typically includes a modem 1098 or other means for establishing communications over the wide area network 1094, such as the Internet. The modem 1098, which may be internal or external, is connected to the system bus 1048 via a serial port interface 1068. In a networked environment, program modules depicted relative to the personal computer 1042, or portions thereof, may be stored in the remote memory storage device. It will be appreciated that the network connections shown are exemplary and other means of establishing a communications link between the computers may be used.

Computer 1042 also includes a broadcast tuner 1099. Broadcast tuner 1099 receives broadcast signals either directly (e.g., analog or digital cable transmissions fed directly into tuner 1099) or via a reception device (e.g., via antenna or satellite dish).

Computer 1042 typically includes at least some form of computer readable media. Computer readable media can be any available media that can be accessed by computer 1042. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 1042. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The subject matter has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the described subject matter.

CONCLUSION

Although the above description uses language that is specific to structural features and/or methodological acts, it is to be understood that the described arrangements and procedures defined in the appended claims are not limited to the specific features or acts described. Rather, the specific features and acts are disclosed as exemplary forms of implementing the described arrangements and procedures.

The invention claimed is:

1. A computer-implemented method comprising:
   receiving a continuous touch stylus-based user input; and
   responsive to receiving the continuous touch stylus-based user input, displaying a menu comprising multiple selectable items that are simultaneously displayed, the multiple selectable items to allow a user to select an item of the multiple selectable items, wherein:
   selection of a first item of the multiple selectable items causes a first action comprising directing a computer system to interpret one or more subsequent stylus-based user inputs as hover cursor input or handwriting input; and
   an alternate selection of a second item of the multiple selectable items causes a second action that is different from the first action, the second action comprising: directing the computer system to interpret one or more subsequent stylus-based user inputs as hover cursor input or handwriting input,
   wherein selection of a selectable item that directs the computer system to interpret one or more subsequent stylus-based user inputs as handwriting input allows the user to provide handwriting input without being confined to a window of an underlying program.

2. A method as recited in claim 1, further comprising:
   determining whether an item of the selectable items has been selected within a predetermined amount of time since presenting the menu; and
   responsive to determining that the item has not been selected within the predetermined amount, dismissing the menu.

3. A method as recited in claim 1, wherein the menu comprises an action area that is receptive to stylus-based input, and wherein the method further comprises:
   identifying stylus input outside of the action area; and
   responsive to identifying stylus input outside of the action area, dismissing the menu.

4. A method as recited in claim 1, wherein the method, responsive to receiving the input, further comprises:
   detecting selection of an item of the selectable items; and
   responsive to detection the selection:
   (a) hiding the menu; and
   (b) performing a task corresponding to the item.

5. A method as recited in claim 4, wherein the task comprises: (a) generating right-mouse-button input; (b) moving a cursor over a display screen; (c) generating keyboard data; or (d) generating handwritten data.

6. A method as recited in claim 1, further comprising:
   detecting user selection of an item of the selectable items; and
   responsive to detecting the user selection:
   (a) hiding the menu;
   (b) performing a task corresponding to the item, the task having a result; and
   (c) communicating the result as input to a program.

7. A computing device comprising:
   a processor;
   a memory coupled to the processor, the memory comprising computer-executable instructions, the processor being configured to fetch and execute the computer-executable instructions for:
   receiving a stylus-based user input; and
   responsive to receiving the input, displaying a menu comprising multiple selectable items to allow a user to:
   select a first item of the multiple selectable items to perform a first action comprising: directing the computing device to interpret one or more subsequent stylus-based user inputs as hover cursor input or handwriting input; and
   alternately, select a second item of the multiple selectable items to perform a second action that is different from the first action, the second action comprising: directing the computing device to interpret one or more subsequent stylus-based user inputs as hover cursor input or handwriting input,
   wherein the selection of handwriting input allows the user to provide handwriting input without being confined to a window of an underlying program.

8. A computing device as recited in claim 7, further comprising instructions for:
   determining whether an item of the selectable items has been selected within a predetermined amount of time since presenting the menu; and
   responsive to determining that the item has not been selected within the predetermined amount, dismissing the menu.

9. A computing device as recited in claim 7, wherein the menu comprises an action area that is receptive to stylus-based input, and wherein the computing device further comprises instructions for:
   identifying stylus-based user input outside of the action area; and
   responsive to identifying the stylus-based user input, dismissing the menu.

10. A computing device as recited in claim 7, further comprising instructions for:
  detecting selection of an item of the selectable items; and
  responsive to detection the selection:
    (a) hiding the menu; and
    (b) performing a task corresponding to the item.

11. A computing device as recited in claim 10, wherein the task comprises instructions for: (a) communicating a right mouse click event to a computer program; (b) moving a cursor over a display screen; (c) generating keyboard data; or (d) generating and interpreting handwritten data.

12. A computing device as recited in claim 7, wherein responsive to receiving the input, the instructions further comprise instructions for:
  detecting selection of an item of the selectable items; and
  responsive to detecting the selection:
  (a) hiding the menu;
  (b) performing a task that corresponds to the item, the task having a result; and
  (c) communicating the result as input to an application.

13. A computing device comprising:
  processing means for:
  receiving a continuous touch stylus-based user input; and
  responsive to receiving the continuous touch stylus-based user input, displaying a menu comprising multiple selectable items to allow a user to:
  select a first item of the multiple selectable items to perform a first action comprising: directing the computing device to interpret one or more subsequent stylus-based user inputs as hover cursor input or handwriting input; and
  alternately, select a second item of the multiple selectable items to perform a second action that is different from the first action, the second action comprising: directing the computing device to interpret one or more subsequent stylus-based user inputs as hover cursor input or handwriting input,
  wherein selection of a selectable item that directs the computing device to interpret one or more subsequent stylus-based user inputs as handwriting input allows the user to provide handwriting input without being confined to a window of an underlying program.

14. A computing device as recited in claim 13, further comprising means for:
  if one of the selectable items is selected:
    (a) hiding the menu;
    (b) performing a task corresponding to the one selected item, the task having a result; and
    (c) communicating the result as input to a program.

15. A computing device as recited in claim 13, further comprising means for if an item of the selectable items has not been selected for a predetermined amount of time since displaying the menu, dismissing the menu.

16. A computing device as recited in claim 13, wherein the menu comprises an action area that is receptive to stylus-based input, and wherein the computing device further comprises means for if stylus input is identified outside of the action area, dismissing the control.

17. A computing device as recited in claim 13, further comprising means for:
  if an item of the selectable items is selected:
    (a) hiding the menu; and
    (b) performing a task corresponding to the item.

18. A computing device as recited in claim 17, wherein the task comprises means for: (a) communicating a right mouse click event to a computer program; (b) moving a cursor over a display screen; (c) generating keyboard data; or (d) generating and interpreting handwritten data.

* * * * *